(12) United States Patent
Ozeki

(10) Patent No.: US 12,449,967 B2
(45) Date of Patent: Oct. 21, 2025

(54) CONTROLLER

(71) Applicant: Fanuc Corporation, Yamanashi (JP)

(72) Inventor: Shinichi Ozeki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 18 days.

(21) Appl. No.: 18/035,187

(22) PCT Filed: Nov. 17, 2021

(86) PCT No.: PCT/JP2021/042268
§ 371 (c)(1),
(2) Date: May 3, 2023

(87) PCT Pub. No.: WO2022/107822
PCT Pub. Date: May 27, 2022

(65) Prior Publication Data
US 2023/0400977 A1    Dec. 14, 2023

(30) Foreign Application Priority Data
Nov. 20, 2020 (JP) .................. 2020-193518

(51) Int. Cl.
G06F 3/048    (2013.01)
G06F 3/0482    (2013.01)
G06F 3/0486    (2013.01)

(52) U.S. Cl.
CPC .......... G06F 3/0486 (2013.01); G06F 3/0482 (2013.01); *G06F 2203/04803* (2013.01)

(58) Field of Classification Search
CPC ................. G06F 3/0486; G06F 3/0482; G06F 2203/04803
See application file for complete search history.

(56) References Cited

U.S. PATENT DOCUMENTS 6,915,514 B1 * 7/2005 Machida ............... G06F 9/4411
717/174
8,302,026 B2 * 10/2012 Wang ..................... G06F 3/0481
715/788

(Continued)

FOREIGN PATENT DOCUMENTS

JP    H06332521 A    12/1994
JP    2000066709 A    3/2000

(Continued)

OTHER PUBLICATIONS

International Search Report and Written Opinion for International Application No. PCT/JP2021/042268, dated Feb. 1, 2022, 5 pages.

(Continued)

*Primary Examiner* — Scott T Baderman
*Assistant Examiner* — Mario M Velez-Lopez
(74) *Attorney, Agent, or Firm* — Buchanan Ingersoll & Rooney PC

(57) ABSTRACT

A controller includes a display control unit configured to switch information to be displayed in each of a plurality of split regions due to splitting of a display screen, an editing-screen display unit configured to display an editing screen displaying, for each of the plurality of split regions, as a list, a first displaying and a second displaying in association, the first displaying enabling visual specification of a position of the corresponding split region on the display screen, the second displaying indicating a list of information types displayable in the split region, and an editing unit configured to receive an editing operation to the second displaying, and edit, based on the editing operation, the list of information types displayable in the split region.

9 Claims, 7 Drawing Sheets

(56) References Cited

U.S. PATENT DOCUMENTS

| | | | | |
|---|---|---|---|---|
| 10,586,513 | B2* | 3/2020 | Scheepens | H04N 21/47 |
| 10,740,058 | B2* | 8/2020 | Sirpal | G06F 1/1643 |
| 2005/0024488 | A1* | 2/2005 | Borg | H04N 21/235 |
| | | | | 348/335 |
| 2009/0313658 | A1* | 12/2009 | Nishimura | H04N 21/4314 |
| | | | | 725/59 |
| 2010/0125363 | A1* | 5/2010 | Sakaguchi | G05B 19/409 |
| | | | | 700/248 |
| 2010/0138767 | A1* | 6/2010 | Wang | G06F 3/0481 |
| | | | | 715/769 |
| 2010/0248788 | A1* | 9/2010 | Yook | G06F 3/04886 |
| | | | | 455/566 |
| 2011/0004826 | A1* | 1/2011 | Cho | H04N 5/772 |
| | | | | 707/E17.014 |
| 2011/0035691 | A1* | 2/2011 | Kim | G06F 3/0486 |
| | | | | 715/765 |
| 2014/0164990 | A1* | 6/2014 | Kim | G06F 3/0486 |
| | | | | 715/788 |
| 2017/0146978 | A1* | 5/2017 | Kawai | G05B 19/402 |
| 2020/0117355 | A1* | 4/2020 | Vranjes | G06F 3/04847 |
| 2020/0125245 | A1* | 4/2020 | Osada | G06F 3/14 |
| 2020/0142382 | A1* | 5/2020 | Hiranuma | G05B 19/4063 |
| 2021/0103379 | A1* | 4/2021 | Adachi | G06F 40/106 |
| 2024/0373105 | A1* | 11/2024 | Tomimori | G06F 3/017 |

FOREIGN PATENT DOCUMENTS

| | | |
|---|---|---|
| JP | 2010152882 A | 7/2010 |
| JP | 2012155367 A | 8/2012 |
| JP | 2018128813 A | 8/2018 |
| JP | 2018128814 A | 8/2018 |
| JP | 2020064571 A | 4/2020 |
| WO | 2015194010 A1 | 12/2015 |

OTHER PUBLICATIONS

Japanese Notice of Allowance issued Feb. 20, 2024 by the Japanese Patent Office in corresponding Japanese Application No. 2022-563806. (3 pages).

* cited by examiner

LEFT-AND-RIGHT TWO-WAY SPLITTING

LEFT-AND-RIGHT THREE-WAY SPLITTING

LEFT-AND-RIGHT TWO-WAY SPLITTING + UP-AND-DOWN TWO-WAY SPLITTING

UP-AND-DOWN TWO-WAY SPLITTING + LEFT-AND-RIGHT TWO-WAY SPLITTING OF LOWER PORTION

CONTROLLER

CROSS REFERENCE TO RELATED APPLICATIONS

This is the U.S. National Phase application of PCT/JP2021/042268, filed Nov. 17, 2021, which claims priority to Japanese Patent Application No. 2020-193518, filed Nov. 20, 2020, the disclosures of these applications being incorporated herein by reference in their entireties for all purposes.

FIELD OF THE INVENTION

The present invention relates to a controller.

BACKGROUND OF THE INVENTION

In order to operate an industrial machine, such as a machine tool or a robot, for example, in order to carry out operations in setup work before processing, an operator works while checking different types of information. In order to enable a plurality of different types of information to be referred to in a single screen, in some cases, a controller for controlling an industrial machine has, for example, a function of dividing the display screen of a display device into tile-shaped split regions and displaying respective different types of information in the split regions resulting from the division (e.g., Patent Literature 1).

However, such a display device has limits on the size and the number of pixels of its display screen. Thus, in particular, in a case where an amount of information, difficult to display at a time in a single screen, requires displaying for setup work or the like, such work requires carrying out with switching of information to be displayed in each split region due to division in the screen. Such switching in display is carried out by operating, for example, a longitudinal move softkey, a lateral move softkey, or a machine operation board.

PATENT LITERATURE

Patent Literature 1: JP 2000-066709 A

SUMMARY OF THE INVENTION

As above, for display with switching of a plurality of information types to a plurality of split regions, it is necessary in advance to define what information type is displayable in each split region. Work requiring reference to a lot of information is often carried out not only with viewing of a single information type but also with reference to a plurality of information types arranged side by side. Thus, in consideration of industrial details, it is necessary to define what information type is displayable in which split region. In addition, it is desirable to give a definition, for example, in consideration of a respect as to what information type should be displayed at which position on the screen for easy viewing.

Thus, required is a means for enabling a definition with an entire grasp as to what information type is displayable by switching in each split region.

A controller according to the present invention enables a display screen to be split into a plurality of split regions and display of a different information type to each split region and provides a user interface screen enabling editing of an information type to be displayed to each split region. On the screen, the position of each split region on the display screen and a list of information types displayable in the corresponding split region are displayed in combination. Due to the display, an operator can grasp, at a glance, an information type displayable in each split region. From among all information types displayable by the controller, a predetermined information type can be added to the list of information types displayable in each split region, for example, by a drag-and-drop operation.

According to one aspect of the present invention, provided is a controller enabling a display screen to be split into a plurality of split regions, the controller including: a display control unit configured to switch information to be displayed in each of the plurality of split regions; a display-info-type editing-screen display unit configured to display a display-info-type editing screen displaying, for each of the plurality of split regions, as a list, a first displaying and a second displaying in association, the first displaying enabling visual specification of a position of the corresponding split region on the display screen, the second displaying indicating a list of information types displayable in the split region; and a display-info-type editing unit configured to receive an editing operation to the second displaying, the display-info-type editing unit being configured to edit, based on the editing operation, the list of information types displayable in the split region, in which the display control unit performs, based on the list of information types displayable associated with each split region edited by the display-info-type editing unit, control of switching the information to be displayed in each of the plurality of split regions.

According to the one aspect of the present invention, information types displayable in each split region can be displayed as a list and furthermore an information type to be displayed in each split region can be freely selected, leading to an improvement in visibility to an operator, a reduction in the burden of the operator in work, and a reduction in operating time.

DETAILED DESCRIPTION OF EMBODIMENTS OF THE INVENTION

An embodiment of the present invention will be described below with the drawings.

Figure 1:
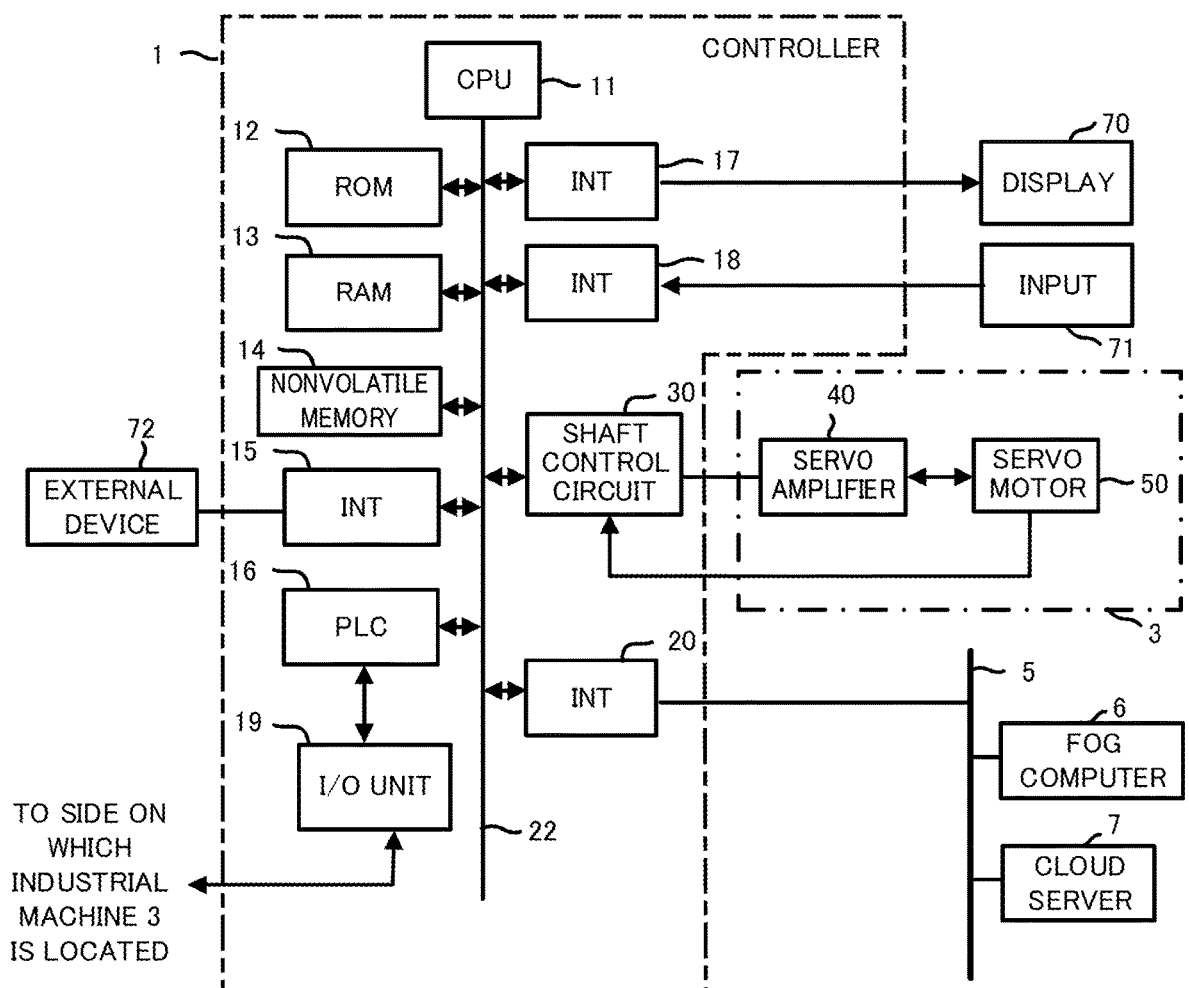
FIG. 1 illustrates a schematic hardware configuration of a controller according to a first embodiment.

FIG. 1 illustrates a schematic hardware configuration of main parts of a controller according to a first embodiment of the present invention. The controller 1 according to the present invention can be implemented, for example, as a controller configured to control an industrial machine 3, based on a control program.

A CPU 11 included in the controller 1 according to the present embodiment serves as a processor that controls the entirety of the controller 1. The CPU 11 reads a system program stored in a ROM 12 through a bus 22 and controls the entirety of the controller 1 in accordance with the system program. A RAM 13 temporarily stores, for example, temporary calculation data and display data, and various types of data that are input from outside.

A nonvolatile memory 14 is achieved, for example, with a memory or solid state drive (SSD) backed up by a battery (not shown) and retains its memory state even when the power of the controller 1 is turned off. The nonvolatile memory 14 stores, for example, a control program and data that are read from an external device 72 through an interface 15, a control program and data input from an input device 71 through an interface 18, and a control program or data acquired from a different device, such as a fog computer 6 or a cloud server 7, through a network 5. Data to be stored in the nonvolatile memory 14 may include, for example, data according to the position, rate, acceleration, and load of each motor included in the industrial machine 3 and respective physical quantities detected by sensors (not shown) attached to the industrial machine 3. The control program and data stored in the nonvolatile memory 14 may be developed on the RAM 13 at the time of execution or utilization. The ROM 12 has various types of system programs, such as a publicly known analysis program, written therein in advance.

The interface 15 serves as an interface for connecting the CPU 11 in the controller 1 and the external device 72, such as an external storage medium. For example, a control program and setting data for use in control of the industrial machine 3 is read from the side on which the external device 72 is located. For example, the control program and setting data edited in the controller 1 can be stored in an external storage medium (not shown), such as a CF card or a USB memory, through the external device 72. A programmable logic controller (PLC) 16 executes a ladder program to output, through an I/O unit 19, signals to the industrial machine 3 and peripheral devices of the industrial machine 3 (e.g., a tool exchanger, an actuator, such as a robot, and sensors, such as a temperature sensor and a humidity sensor, attached to the industrial machine 3), resulting in control. The PLC 16 receives, for example, signals from various types of switches on an operation board with which the body of the industrial machine 3 is provided and signals from peripheral devices and performs signal processing necessary to the signals. Then, the PLC 16 sends, to the CPU 11, the signals subjected to the signal processing.

An interface 20 serves as an interface for connecting the CPU 11 in the controller 1 and the network 5 that is wired or wireless. The network 5 may achieve communication with a technology, such as serial communication, for example, based on RS-485, Ethernet (registered trademark) communication, optical communication, a wireless LAN, Wi-Fi (registered trademark), or Bluetooth (registered trademark). Other machines and higher-level management devices, such as the fog computer 6 and the cloud server 7, are connected to the network 5, enabling mutual data exchange with the controller 1.

A display device 70 displays, for example, each piece of data read onto a memory and data acquired due to execution of a program, which are output through an interface 17. Desirably, the display 70 is allowed to acquire information according to its display performance (e.g., display size and the number of pixels) from the controller 1. The acquired information according to the display performance may be sequentially acquired or may be stored in the RAM 13 or the nonvolatile memory 14, similarly to other information. The input 71 including, for example, a keyboard and a pointing device sends a command and data based on an operation by a worker through the interface 18 to the CPU 11.

A shaft control circuit 30 configured to control a shaft included in the industrial machine 3 receives a command for the amount of movement of the shaft from the CPU 11 and outputs a command for the shaft to a servo amplifier 40. When receiving the command, the servo amplifier 40 drives a servo motor 50 for moving, along the shaft, a drive unit included in the industrial machine 3. The servo motor 50 for the shaft has a built-in position/rate detector (not shown) and feeds back a position/rate feedback signal from the position/rate detector to the shaft control circuit 30, leading to position/rate feedback control. Note that, referring to the hardware configuration illustrated in FIG. 1, the shaft control circuit 30, the servo amplifier 40, and the servo motor 50 are each one in number. However, in practice, provided are shaft control circuits 30, servo amplifiers 40, and servo motors 50 of which the numbers are identical to the number of shafts to be controlled included in the industrial machine 3.

Figure 2:
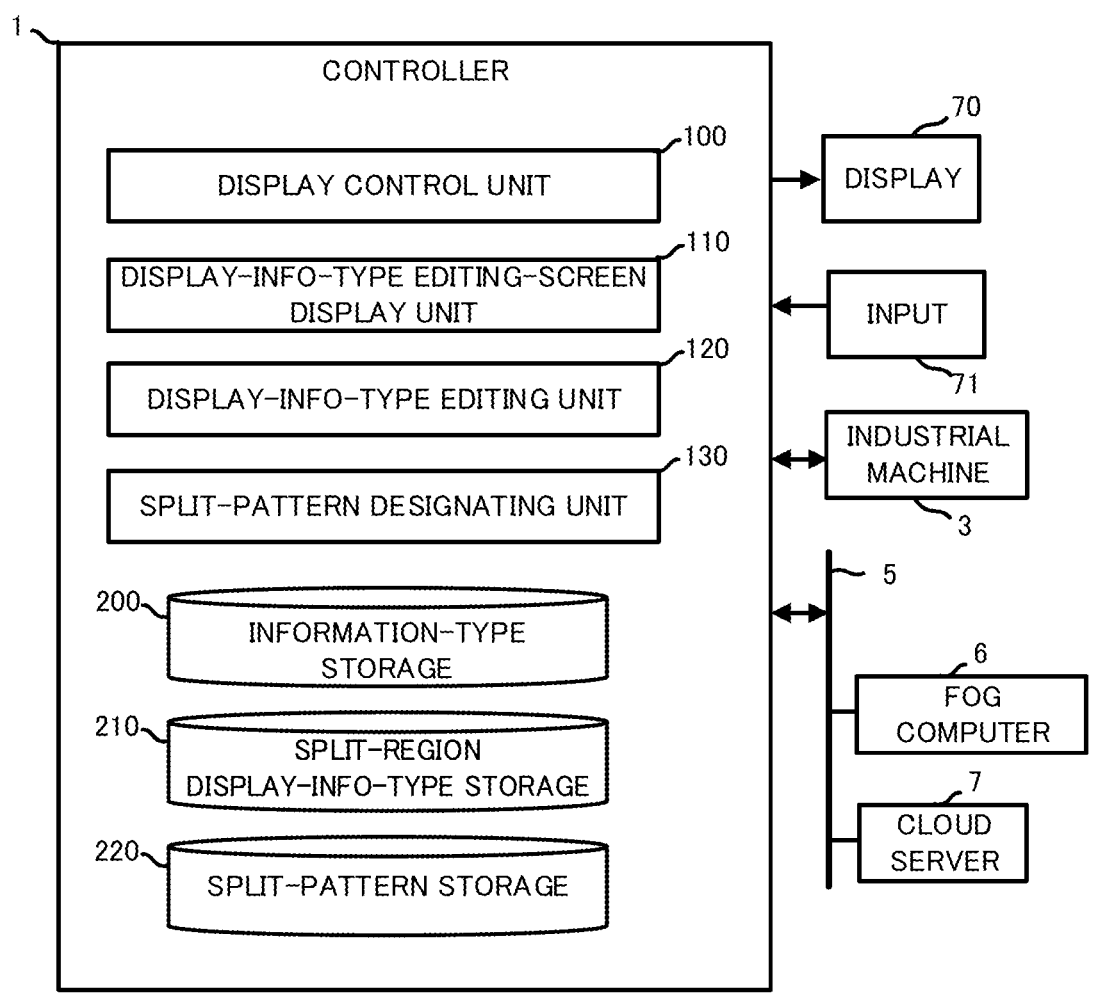
FIG. 2 is a schematic block diagram of functions of the controller according to the first embodiment.

FIG. 2 is a schematic block diagram of functions included in the controller 1 according to the first embodiment of the present invention. The CPU 11 included in the controller 1 shown in FIG. 1 executes a system program to control the operation of each part of the controller 1, leading to achievement of each function included in the controller 1 according to the present embodiment.

The controller 1 according to the present embodiment includes a display control unit 100, a display-info-type editing-screen display unit 110, a display-info-type editing unit 120, and a split-pattern designating unit 130. The RAM 13 and the nonvolatile memory 14 in the controller 1 is provided with an information-type storage 200 that stores at least information for identifying an information type displayable by the controller 1 (e.g., the name of the information type and a pointer to a display program for displaying information according to the information type), a split-region display-info-type storage 210 serving as an area for storing an information type displayable due to allocation to each split region, in association with the corresponding split region, and a split-pattern storage 220 serving as an area in which a split pattern indicating how to split the display screen of the display 70 is stored in advance.

The CPU 11 included in the controller 1 shown in FIG. 1 executes the system program read from the ROM 12 to perform mainly arithmetic processing with the RAM 13 and the nonvolatile memory 14 and display output processing with the interface 17, resulting in achievement of the display control unit 100. The display control unit 100 splits the display screen of the display 70 into a plurality of split regions and displays information according to a designated information type in each split region. The display control unit 100 usually treats the display screen of the display 70 as a single display region and displays information according to a predetermined information type determined by an operation from an operator to the display region. In response to a predetermined operation from the operator, the display control unit 100 splits the display screen into a plurality of split regions, based on the split pattern designated by the split-pattern designating unit 130. Then, the unit 100 displays, in each split region, information according to a predetermined information type stored in the split-region display-info-type storage 210.

The CPU 11 included in the controller 1 shown in FIG. 1 executes the system program read from the ROM 12 to perform mainly arithmetic processing with the RAM 13 and the nonvolatile memory 14 and display output processing through the interface 17, resulting in achievement of the display-info-type editing-screen display unit 110. The display-info-type editing-screen display unit 110 displays a display-info-type editing screen on the display screen of the display device 70.

Figure 3:
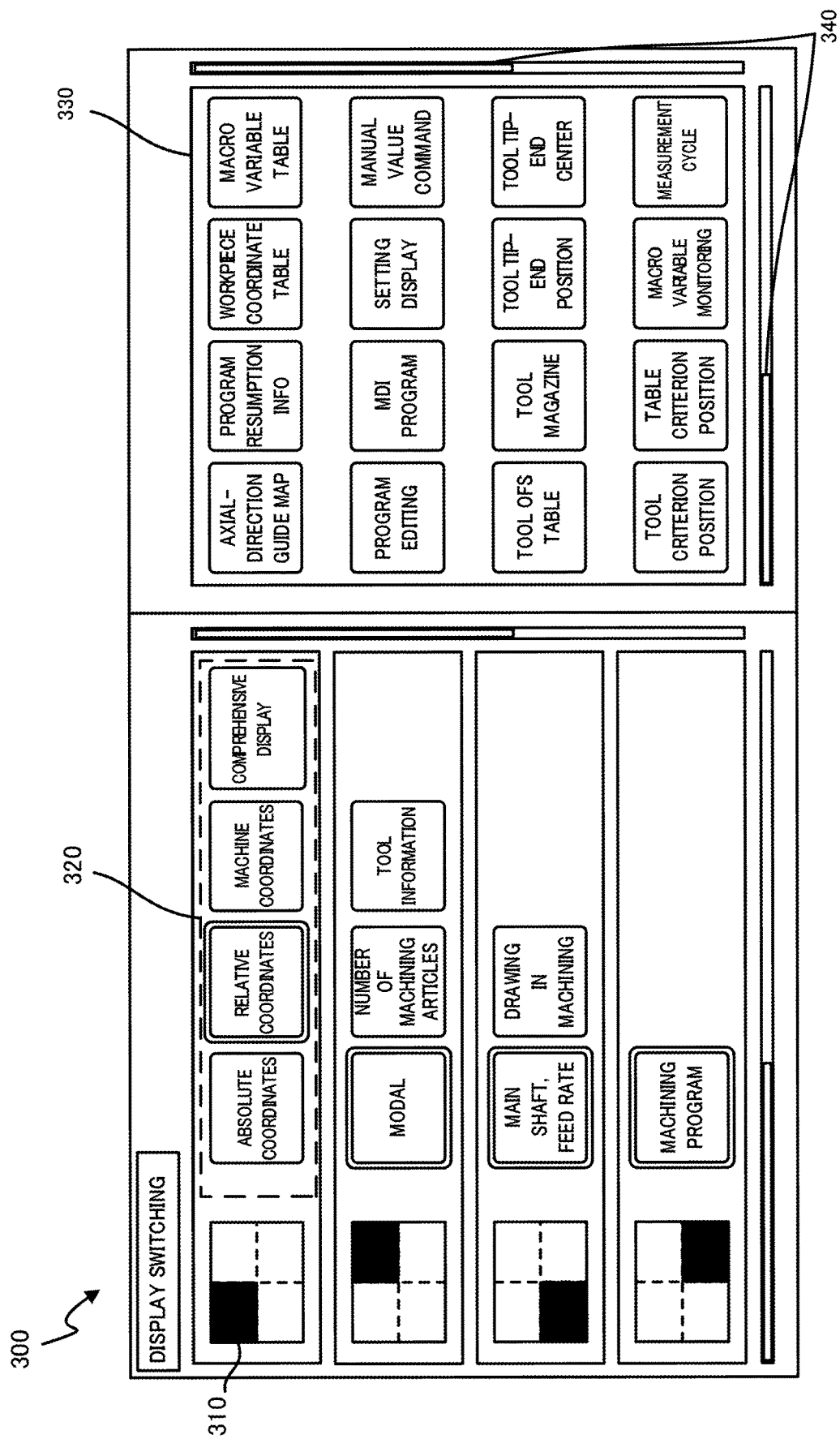
FIG. 3 illustrates an exemplary display-info-type editing screen.

FIG. 3 illustrates an exemplary display-info-type editing screen. In the example of FIG. 3, given is an exemplary split pattern in which the display screen is split into four split regions for display by left-and-right two-way splitting and up-and-down two-way splitting.

The display-info-type editing screen 300 includes at least a first displaying 310 enabling visual specification of the position of each split region on the display screen. The first displaying 310 may further enable visual specification of the size of each split region on the display screen. In the example of FIG. 3, the first displaying 310 is given in an icon format in which the entire display screen is split with parting lines (dotted lines) and the position of a split region on the display screen is black.

The display-info-type editing screen 300 includes at least a second displaying 320 indicating a list of information types displayable in each split region. The second displaying 320 may be highlighted in display such that the information type currently displayed in the corresponding split region can be grasped. In the example of FIG. 3, the second displaying 320 is given in an icon format in which the name of an information type is displayed.

As shown in FIG. 3, icons displayed with double frames indicate that information according to the information type "relative coordinates" is displayed in the upper left split region, information according to the information type "modal" is displayed in the upper right split region, information according to the information type "main shaft, feed rate" is displayed in the lower left split region, and information according to the information type "machining program" is displayed in the lower right split region. The first displaying 310 and the second displaying 320 identical in split region are displayed such that the correspondence relationship therebetween can be grasped. The first displaying 310 and the second displaying 320 are displayed based on the correspondence relationship between each split region and an information type allocated to the corresponding split region, stored in the split-region display-info-type storage 210. In the example of FIG. 3, for example, the first displaying 310 and the second displaying 320 identical in split region are displayed side by side in the same row. In this example, in the upper left split region, the information types "absolute coordinates", "relative coordinates", "machine coordinates", and "comprehensive display" are displayable. Such a display-info-type editing screen as above enables a grasp at a glance as to what information type is displayable in which split region.

The display-info-type editing screen 300 may further include a third displaying 330 for displaying, as a list, information types displayable on the display screen. The third displaying 330 displays, as a list, information types stored in the information-type storage 200. In the example of FIG. 3, each information type is given in an icon format in which its name is displayed. The third displaying 330 is used for selection of an information type to be allocated to a split region by an editing operation to be described below. As exemplified in FIG. 3, the third displaying 330 may display, as a list, all the information types displayable. Separately, a user interface for search narrowing, not illustrated, may be provided, and some information types resulting from search narrowing may be displayed as a list. In a case where an information type to be displayed is out of the range of display, scroll display may be performed with, for example, a scroll bar 340.

The CPU 11 included in the controller 1 shown in FIG. 1 executes the system program read from the ROM 12 to perform mainly arithmetic processing with the RAM 13 and the nonvolatile memory 14 and input/output processing through the interfaces 17 and 18, resulting in achievement of the display-info-type editing unit 120. The display-info-type editing unit 120 receives an editing operation to the second displaying 320 and edits the list of information types displayable due to allocation to the split region, based on the editing operation. In a case where, as a result of editing by the display-info-type editing unit 120, a change is made in the allocation of an information type to the split region, the change in the allocation is updated to the split-region display-info-type storage 210. An editing operation that the display-info-type editing unit 120 receives may be, for example, a drag-and-drop operation with the input 71.

Figure 4:
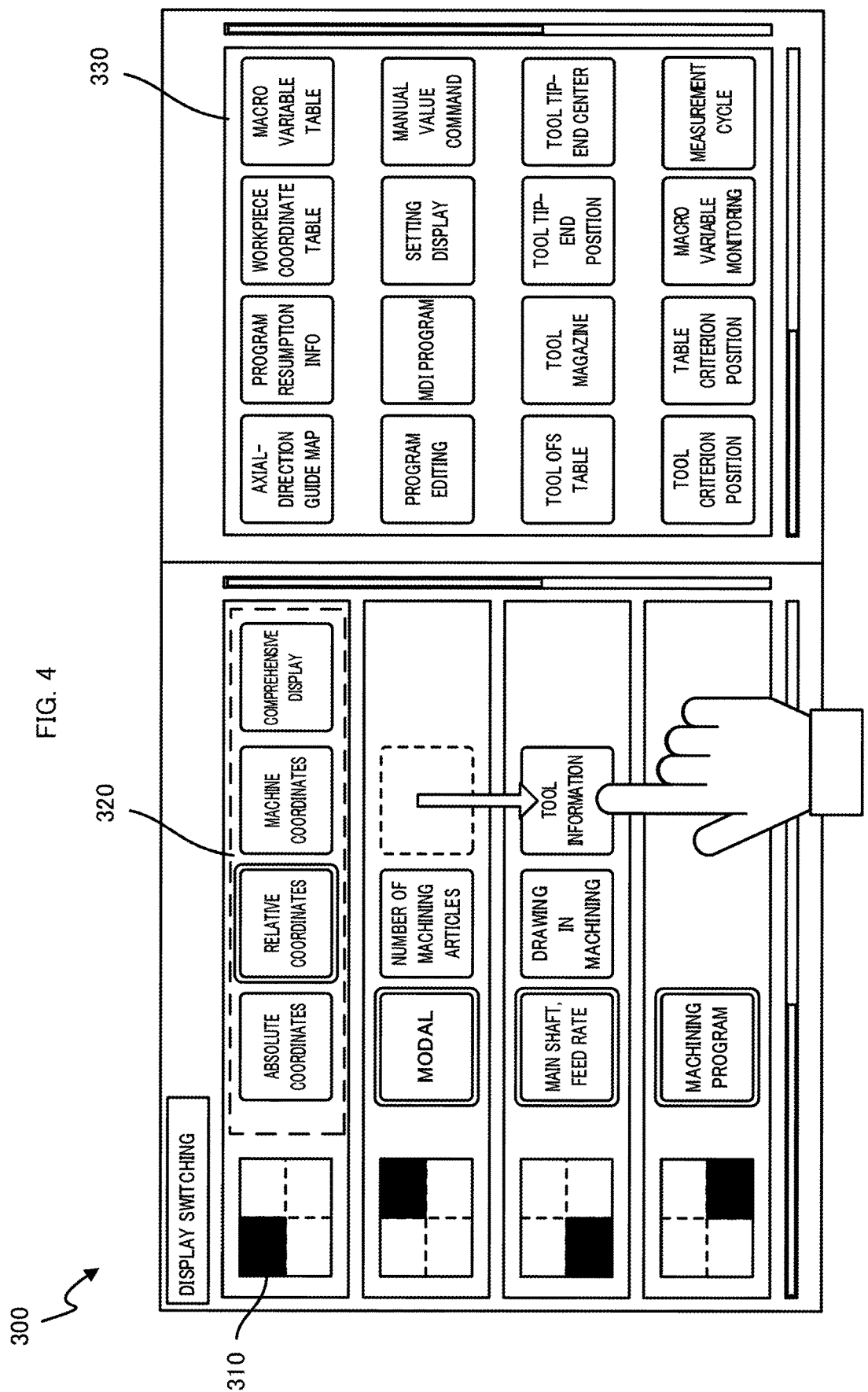
FIG. 4 illustrates exemplary editing of a list of information types displayable in a split region, due to a drag-and-drop operation.

FIG. 4 illustrates exemplary editing of a list of information types displayable in a split region, due to a drag-and-drop operation. In the example of FIG. 4, illustrated is an operation to reallocate, to the lower left split region, the information type of tool information allocated to the upper right split region on the display-info-type editing screen 300 exemplified in FIG. 3. In such a case, the operator operates the pointing device to drag and drop, to the position of the second displaying 320 corresponding to the lower left split region, an icon for the information type of tool information displayed on the second displaying 320 corresponding to the upper right split region. Thus, the information type of tool information allocated to the upper right split region is reallocated to the lower left split region.

Figure 5:
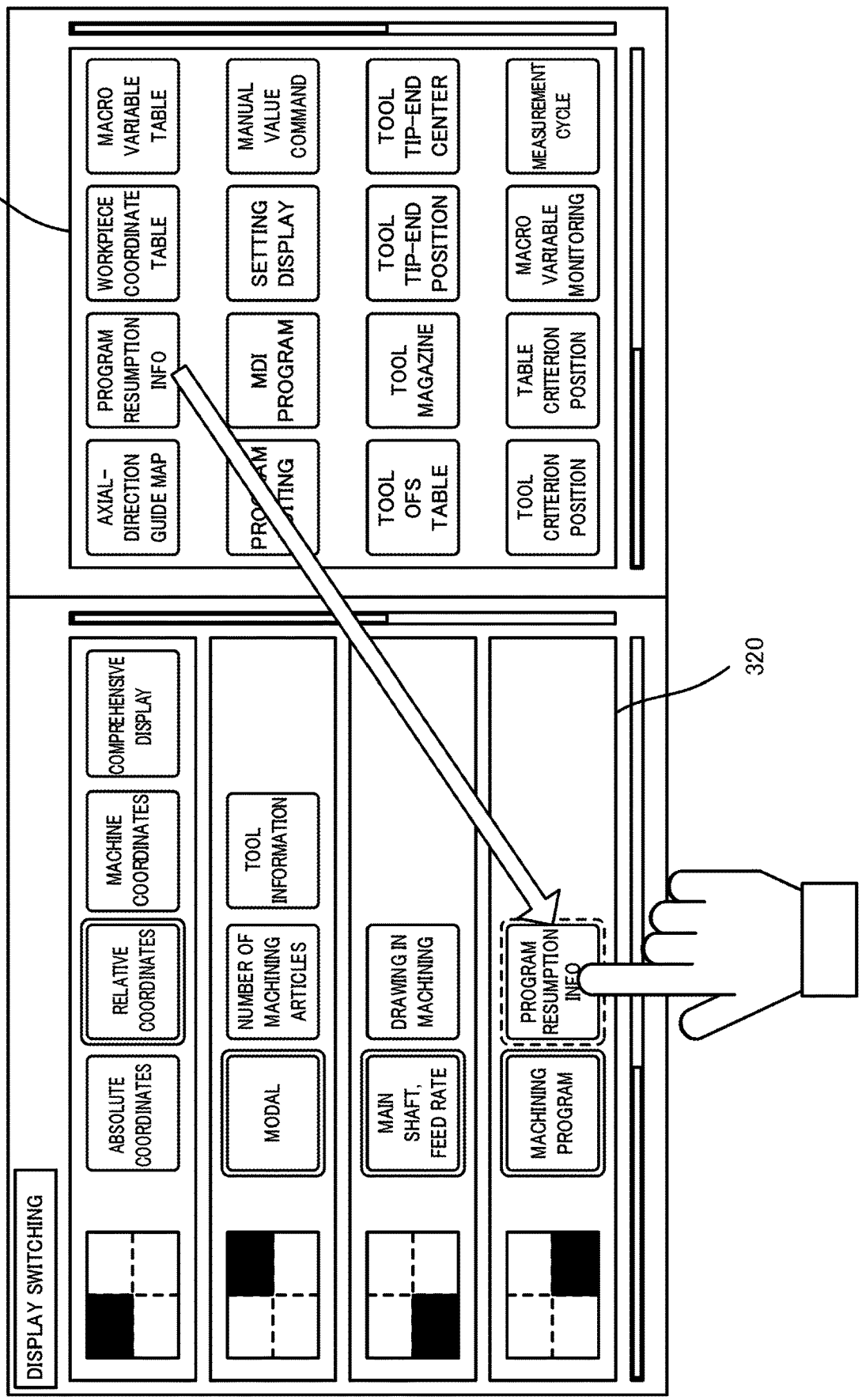
FIG. 5 illustrates other exemplary editing of a list of information types displayable in a split region, due to a drag-and-drop operation.

FIG. 5 illustrates other exemplary editing of a list of information types displayable in a split region, due to a drag-and-drop operation. In the example of FIG. 5, illustrated is an operation to allocate, to the lower right split region, the information type of program resumption information displayed on the third displaying 330 on the display-info-type editing screen 300 exemplified in FIG. 3. In such a case, the operator operates the pointing device to drag and drop, to the position of the second displaying 320 corresponding to the lower right split region, an icon for the information type of program resumption information displayed on the third displaying 330. Thus, the information type of program resumption information can be allocated to the lower right split region.

Figure 6:
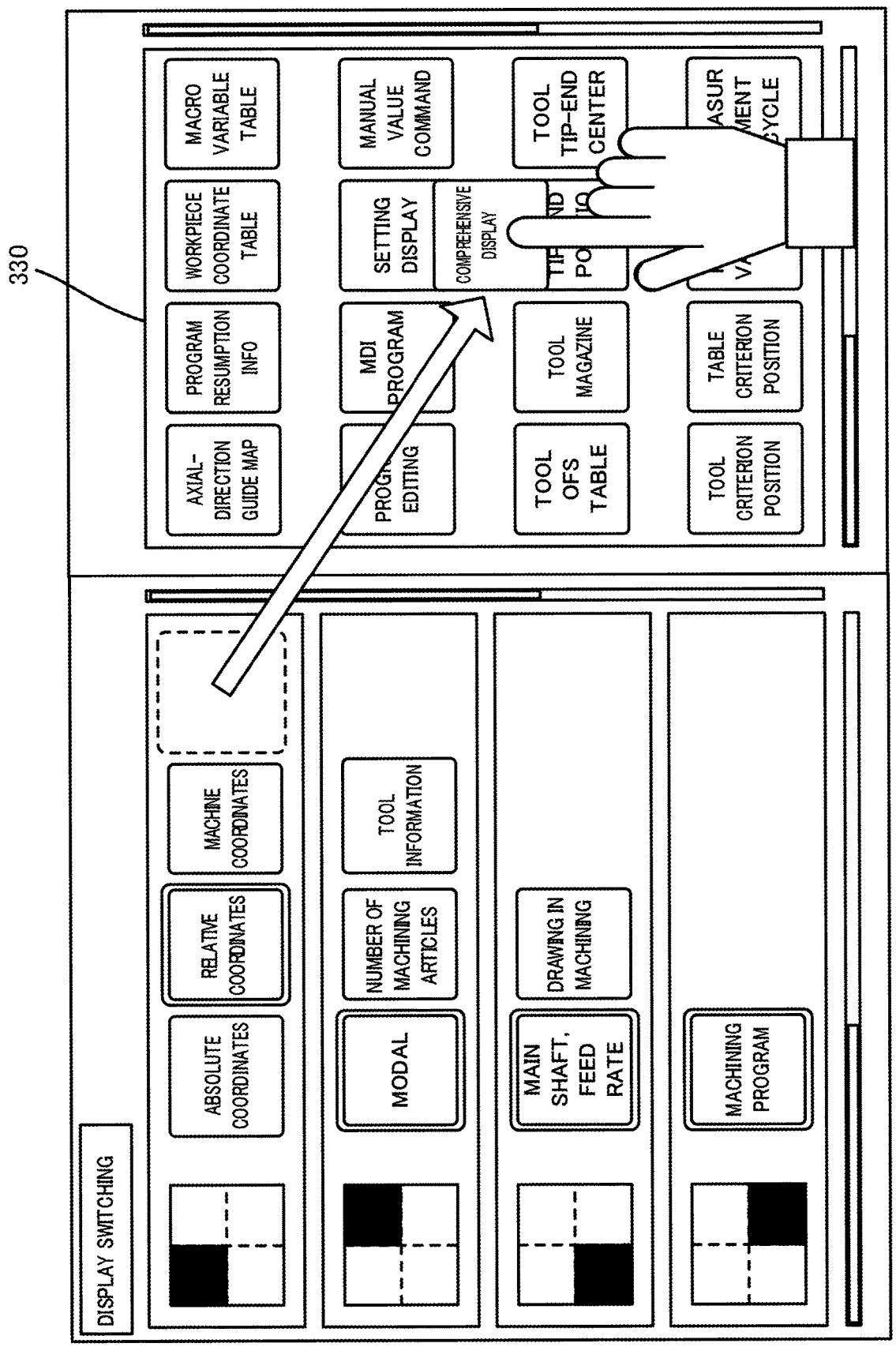
FIG. 6 illustrates still other exemplary editing of a list of information types displayable in a split region, due to a drag-and-drop operation.

FIG. 6 illustrates still other exemplary editing of a list of information types displayable in a split region, due to a drag-and-drop operation. In the example of FIG. 6, illustrated is an operation to delete the information type of comprehensive display allocated to the upper left split region on the display-info-type editing screen 300 exemplified in FIG. 3. In such a case, the operator operates the pointing device to drag and drop, to an appropriate position on the third displaying 330, an icon for the information type of comprehensive display allocated to the upper left split region. Thus, the information type of comprehensive display allocated to the upper left split region can be deleted.

Figure 7:
FIG. 7 illustrates exemplary split patterns.
Figure 7:
Figure 7:
Figure 7:
Figure 7:
Figure 7:
Figure 7:
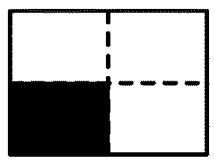
Figure 7:
Figure 7:
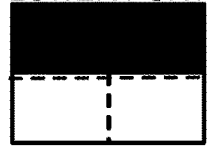
Figure 7:
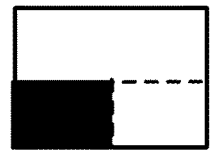
Figure 7:

The CPU 11 included in the controller 1 illustrated in FIG. 1 executes the system program read from the ROM 12 to perform mainly arithmetic processing with the RAM 13 and the nonvolatile memory 14, resulting in achievement of the split-pattern designating unit 130. The split-pattern designating unit 130 designates a split pattern indicating how to split the display screen of the display device 70. The split-pattern designating unit 130 may allow the operator to select any of the split patterns (as illustrated in FIG. 7, for example, a left-and-right two-way split pattern, a split pattern resulting from left-and-right two-way splitting and up-and-down two-way splitting, a left-and-right three-way split pattern, and a split pattern resulting from up-and-down two-way splitting and then left-and-right two-way splitting of the lower portion) stored in advance in the split-pattern storage 220 and then may designate the split pattern. The split-pattern designating unit 130 may allow the operator to designate the number of splits in at least either the vertical direction or horizontal direction of the display screen and then may designate a split pattern.

The controller 1 having the above configuration enables display of a list of information types displayable in each split region and free selection of an information type to be displayed in each split region, leading to an improvement in visibility to the operator, a reduction in the burden of the operator in work, and a reduction in operating time. In particular, the position of each split region on the display screen and an information type displayable in each split region can be grasped at a glance. Thus, in a case where a lot of information is displayed while being switched for setup work or the like and as necessary, for example, a plurality of information types mutually relevant requires side-by-side displaying, the relationship between the position of a split region enabling efficient work and an information type displayable can be arranged.

The embodiment of the present invention has been described above. However, the present invention is not limited to the examples in the embodiment described above. Thus, the present invention can be achieved in various aspects with appropriate alterations.

For example, the split-pattern designating unit 130 may set a limit on designable split patterns, based on the display size or the number of pixels of the display 70. In general, such display devices 70 are different in the size of the screen (inches) or the number of pixels of the display screen. For example, in the controller 1 to which a vertically long display 70 with an aspect ratio of 9:16 is attached, selection of a left-and-right four-way split pattern causes each split region to be vertically elongated. Thus, for viewing of information regarding a program or a drawn simulation image, left-and-right scrolling is required. A reduction in the number of pixels of one split region causes a reduction in the amount of information displayable on the screen, leading to lack of information in browsing. In order to avoid such problems, in a case where the split pattern selected by the operator is unsuitable to the display size or the number of pixels of the display 70, the split-pattern designating unit 130 may prohibit the selection. Similarly, in a case where the operator designates the number of splits in at least either the vertical direction or horizontal direction of the display screen and the designated number of splits causes an excessive reduction in the size or the number of pixels of each split region, the split-pattern designating unit 130 may prohibit the designation.

REFERENCE SIGNS LIST

1 Controller
3 Industrial machine
5 Network
6 Fog computer
7 Cloud server
11 CPU
12 ROM
13 RAM
14 Nonvolatile memory
17, 18, 20 Interface
16 PLC
19 I/O unit
22 Bus
30 Shaft control circuit
40 Servo amplifier
50 Servo motor
70 Display
71 Input
72 External device
100 Display control unit
110 Display-info-type editing-screen display unit
120 Display-info-type editing unit
130 Split-pattern designating unit
200 Information-type storage
210 Split-region display-info-type storage
220 Split-pattern storage

The invention claimed is:

1. A controller enabling a display screen to be split into a plurality of split regions, the controller comprising a processor configured to:
    switch information to be displayed in each split region of the plurality of split regions;
    display a display-info-type editing screen displaying, for each of the plurality of split regions, as a list, a first display area and a second display area displayed side by side in the same row of the display-info-type editing screen, the first display area enabling a visual representation of a position of the corresponding split region on the display screen, and the second display area indicating a list of information types displayable in the corresponding split region and independent of the other split regions, and a third display area indicating, as a list, from among all information types displayable on the display screen, part or all of the information types; and
    receive an editing operation to the second display area, and edit, based on the editing operation, the list of information types displayable in the corresponding split region, wherein
    the processor performs, based on the list of information types displayable associated with each split region edited by the processor, control of switching the information to be displayed in each of the plurality of split regions,
    in response to receiving a first selection operation to an information type displayed on the third display area and a second selection operation to the second display area according to a predetermined split region, the processor adds, to the split region corresponding to the second display area selected by the second selection operation, the information type selected by the first selection operation,
    in response to receiving a first selection operation to an information type displayed on the second display area according to a predetermined split region and a second selection operation to the second display area according to a split region other than the predetermined split region, the processor reallocates the information type selected by the first selection operation to the split region other than the predetermined split region, and in response to receiving a first selection operation to an information type displayed on the second display area according to a predetermined split region and a second selection operation to the third display area, the processor deletes the information type selected by the first selection operation from the predetermined split region.

2. The controller according to claim 1, wherein the processor is further configured to:

design a split pattern to the display screen.

3. The controller according to claim 2, wherein the processor is further configured to:

determine, in accordance with the split pattern designated by the processor, a displayable information type for each split region.

4. The controller according to claim 2, wherein the processor is further configured to design, from among a plurality of split patterns prepared in advance, the split pattern to the display screen.

5. The controller according to claim 2, wherein the wherein the processor is further configured to design, based on designation of a number of splits in at least either a vertical direction or horizontal direction of the display screen, the split pattern to the display screen.

6. The controller according to claim 4, wherein the processor sets a limit on a designable split pattern, based on at least either a display size or a number of pixels of the display screen.

7. The controller according to claim 5, wherein the processor sets a limit on the number of splits, based on at least either a display size or a number of pixels of the display screen.

8. The controller according to claim 1, wherein the first display area serves as an icon display indicating the position of the split region on the display screen.

9. The controller according to claim 1, wherein the second display area has a highlighted display for a grasp of an information type displayed in the split region by the processor.

* * * * *